United States Patent [19]

Lockheed

[11] Patent Number: 4,848,700
[45] Date of Patent: Jul. 18, 1989

[54] CANARD CONTROL SYSTEM FOR AIRCRAFT

[76] Inventor: John A. Lockheed, 7925 Dead Indian Rd., Ashland, Oreg. 97520

[21] Appl. No.: 38,953

[22] Filed: Apr. 16, 1987

[51] Int. Cl.$^4$ .......................... B64C 3/38; B64C 9/06; B64C 9/08

[52] U.S. Cl. .................................. 244/45 A; 244/46; 244/48; 244/75 R

[58] Field of Search ..................... 244/45 R, 45 A, 46, 244/48, 89, 220, 221, 225, 75 R

[56] References Cited

U.S. PATENT DOCUMENTS

| | | | |
|---|---|---|---|
| 1,710,423 | 4/1929 | Lindstrand | 244/89 |
| 2,082,172 | 6/1937 | Mignet | 244/225 |
| 2,271,226 | 1/1942 | Johnson | 244/45 |
| 2,858,091 | 10/1958 | Kapenkin | 244/46 |
| 2,924,400 | 2/1960 | Ruget | 244/46 |
| 3,778,926 | 12/1973 | Gladych | 46/79 |
| 3,883,094 | 5/1975 | Mederer | 244/45 |
| 3,884,435 | 5/1975 | Croy et al. | 244/46 |
| 3,926,389 | 12/1975 | Mederer | 244/45 |
| 4,010,920 | 3/1977 | Farner | 244/45 A |
| 4,093,156 | 6/1978 | Coe, Jr. | 244/45 |
| 4,161,300 | 7/1979 | Schwaerzler et al. | 244/45 |
| 4,542,866 | 9/1985 | Caldwell et al. | 244/45 |
| 4,569,493 | 2/1986 | Burhans, Jr. | 244/76 |
| 4,641,800 | 2/1987 | Rutan | 244/45 A |

FOREIGN PATENT DOCUMENTS 850410 12/1939 France ............... 244/45 A

Primary Examiner—Galen Barefoot
Attorney, Agent, or Firm—James D. Givnan, Jr.

[57] ABSTRACT

A system with a canard disposed in a cage with canard fore and aft movement within the cage for trimming purposes. Rails support the cage and include both horizontal and inclined segments with the cage and canard inclined by the latter segments to increase the canard angle of attack to preserve the canard-stallfirst characteristic of the aircraft. A combined canard and flap control assures automatic advancement and inclining of the canard to counteract forward pitching of the aircraft caused by flap deployment.

11 Claims, 1 Drawing Sheet

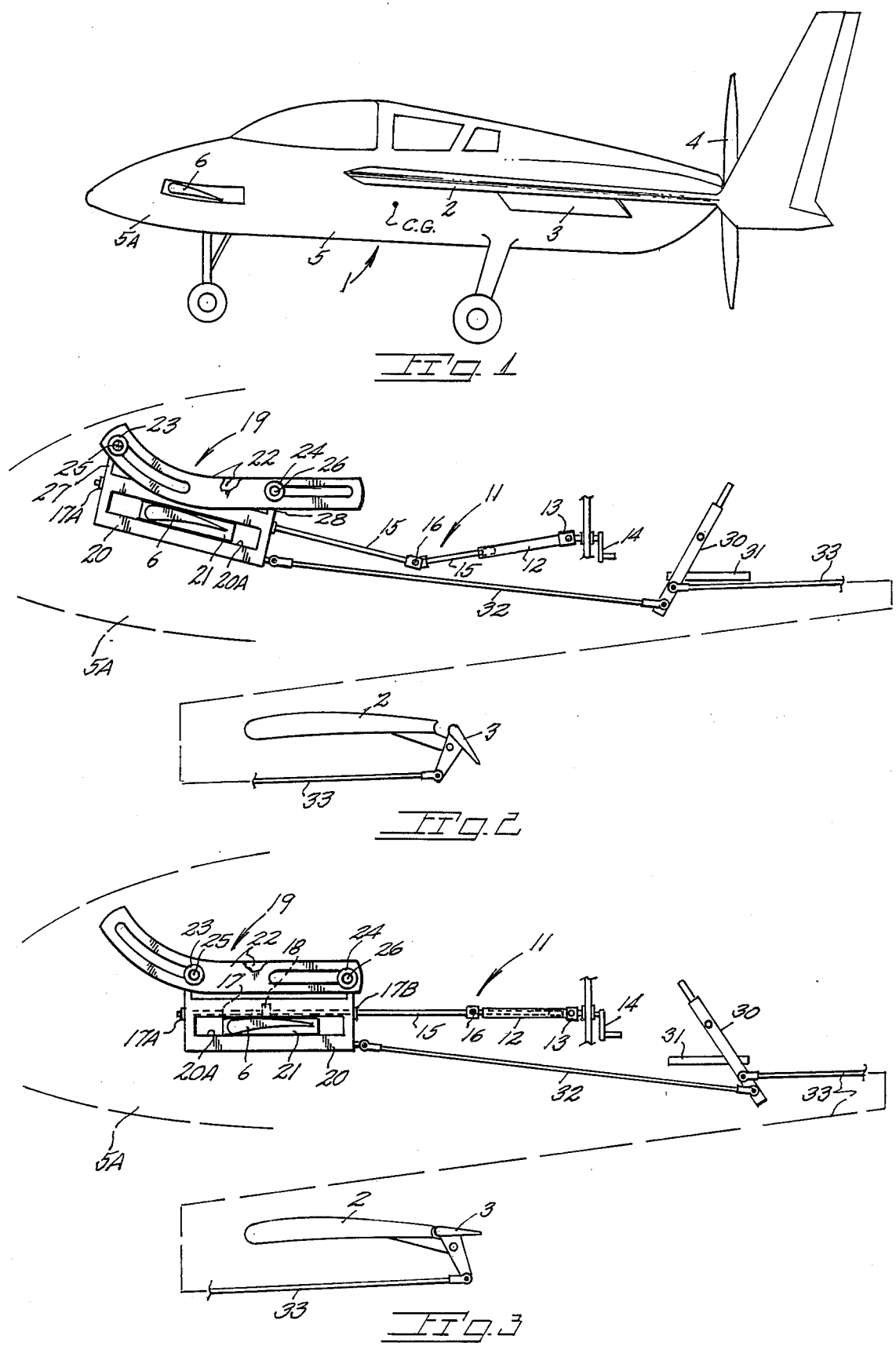

CANARD CONTROL SYSTEM FOR AIRCRAFT

BACKGROUND OF THE INVENTION

The present invention concerns canard equipped aircraft and particularly such aircraft wherein canard lift may be varied.

In canard type aircraft, the small forwardly located wing termed a canard, provides lift forward of the aircarft center of gravity while the main wing center of lift is rearward of the center of gravity. When the canard and wing lift forces are in equilibrium the aircraft is stable, with no movement about its lateral or pitch axis. Currently provision is made in light aircraft of the canard type for altering canard lift for purposes of trimming the aircraft for stable flight, which is typically accomplished by a trim setting of the canard elevators, which incurs increased drag and lowers aircraft performance. Additionally, such trim positioning of canard elevators incurs the risk of "running out of elevator" when large trim adjustments are required, thereby precluding additional elevator movement for steep turns or approach and landing pitch changes.

A drawback to light aircraft of the canard type is that for the most part they do not utilize wing flaps since the trailing edge of the main wing is rearwardly remote from the aircraft center of gravity and would cause severe forward pitching of the aircraft as a conventional, fixed canard cannot counteract such forward pitching. Accordingly, light canard aircraft are usually without flaps and thus require greater landing and take-off distances than other light aircraft of comparable size and weight.

A still further problem with light aircraft of the canard type is that when the same are flown with less than an optimum weiqht distribution in the pilot, passenger and baggage areas, the aircraft must again be trimmed by setting of its elevators with the resulting increased drag and reduced aircraft performance. To resolve this problem, it is often necessary to carry deadweight in a seat or baggage area to keep the aircraft center of gravity within allowable limits. This practice is highly inconvenient and greatly reduces efficiency of operation.

The prior art on aircraft with positionable canards discloses such aircraft are of the military type and for the most part utilize swingable canards for changing canard lift forces. One such patent, U.S. Pat. No. 4,010,920, discloses a canard that is a primary flight control and positionable fore and aft along the longitudinal axis of the aircarft to change the canard moment arm as well as being positionable about said axis. The arrangement disclosed in the patent clearly does not lend itself to utilization in light aircraft by reason of weight, complexity and cost nor is it coupled to main wing flaps.

U.S. Pat. No. 4,569,493 discloses canards rotatable about a horizontal axis transversely disposed to the aircraft longitudinal axis. U.S. Pat. No. 3,778,926 discloses a toy aircraft having a manually settable canard. U.S. Pat. Nos. 3,883,094; 4,161,300 and 4,542,866 disclose canards positionable about multiple axes parallel and perpendicular to the aircraft longitudinal axis. U.S. Pat. Nos. 4,093,156; 2,924,400 and 3,926,389 disclose canards which swing about vertical axes to vary canard sweep and lift. U.S. Pat. No. 2,271,226 discloses a canard type aircraft with canard elevators connected to main wing flaps.

SUMMARY OF THE PRESENT INVENTION

The present invention is embodied within a flight control system for canard type aircraft which permits the canard to be positioned throughout a wide range of movement to assure the aircraft stability regardless of aircraft loading and radical changes in main wing lift and drag forces resulting from wing flap use.

The forward portion of the aircraft fuselage houses canard carrier means which includes a canard carrier cage adapted generally for fore and aft movement along a rail arrangement. Provision is made in the carrier means for altering the canard angle of attack to preserve the highly desirable attribute of canard aircraft, i.e., the inability to stall. Such is automatically accomplished by an increase in the canard angle of attack when the aircraft is in approach configuration with stalling of the canard at all times occurring before main wing stalling. To assure simultaneous main wing flap and canard movement the canard carrier and the main wing flaps are synchronized to neutralize severe pitching tendencies. A trim control permits the pilot to finely adjust the canard to trim the aircraft for level, descending or ascending flight without the drag that would otherwise be incurred by the setting of the canard elevators.

Important objectives of the present system include the provision of a canard and flap control system which automatically maintains the aircraft in equilibrium about its pitch or lateral axis during wing flap deployment; the provision of a canard and flap control system which permits trimming of the aircraft by independent, incremental fore and aft positioning of the canard; the provision of a canard and flap control system which at all times maintains the canard angle of attack to retain desired stalling characteristics of a canard equipped aircraft, i.e., stalling of the canard prior to stalling of the main wing of the aircraft; the provision of a canard and flap control system amenable to incorporation within light aircraft of the canard type; the provision of a canard and flap control system wherein the canard may be positioned for trimming purposes independently of canard carrier means which positions the canard during main wing flap deployment; the provision of a canard and flap control system including carrier means which both positions the canard along longitudinal axis of the aircraft and ultimately increases the canard angle of attack to assure canard stalling prior to stalling of the main wing; the provision of a canard and flap control system which lends itself either to mechanical, electrical or hydraulic operation; the provision of a positionable canard and canard trim control means for positioning the canard wing fore and aft relative the aircraft center of gravity.

BRIEF DESCRIPTION OF THE DRAWINGS

In the accompanying drawings:

FIG. 1 is a side elevational view of an aircraft embodying the present invention shown in landing configuration;

FIG. 2 is a schematic view of the present canard and flap flight control system in landing configuration; and FIG. 3 is a view similar to FIG. 2 with the canard and flap positioned for normal flight attitude.

DETAILED DESCRIPTION OF THE PREFERRED EMBODIMENTS

With continuing attention to the drawings wherein applied reference numerals indicate parts similarly hereinafter identified, the reference numeral 1 indicates generally an aircraft of the canard type having a main wing 2 equipped with flaps as at 3. A propeller 4 is shown as being of the pusher type.

Carried by the forward portion 5A of the aircraft fuselage 5 is a canard wing 6 hereinafter termed canard. Lift forces from main wing 2 and canard 6 act through different length moment arms from the center of gravity at C.G., to impart stability to the aircraft about its lateral axis. A change of the effective airfoil shape of the canard 6 or the main wing 2 by movement of elevators, deployment of flaps or by change of attitude of either one and/or by change of their moment arms relative to the C.G., will accordingly impart a pitch change to the aircraft about its center of gravity C.G..

With attention to FIG. 3, canard trim means are indicated generally at 11. Said trim means serves to advance or retract canard 6 for the purpose of altering the canard moment arm. Repositioning of the canard forwardly toward the nose of the aircraft increases the canard moment arm while avoiding an increase in drag which would otherwise occur upon airfoil alteration as for example by use of canard trim tabs and/or elevator positioning. One suitable mechanism for canard trim positioning is embodied in an internally splined shaft 12 universally coupled at 13 to a power source such as a crank 14 in the aircraft cockpit. Rotation is imparted thereby to a driven shaft 15 having a universal joint at 16. Shaft 15 has a forward threaded segment at 17 journalled at 17A-17B. A canard mounted traveller at 18 moves in response to shaft rotation to advance or retract canard 6 within a cage 20. A central portion of canard 6 is embodied in a slide 21 suitably entrained within a cage opening 20A for fore and aft movement. In aircraft without main wing flaps the above described canard and canard control means may be utilized for trimming purposes to establish pitch attitude equilibrium for level flight, climb or descent.

Canard carrier means are indicated generally at 19 and include the aforementioned cage which is of boxlike construction and supported in place within the forward fuselage 5A by a fuselage mounted rail assembly having rails at 22 which are laterally spaced and with front and rear roller sets at 23 and 24 joined by shafts 25 and 26. Cage hangers at 27 and 28 depend from the shafts.

Flap and canard control means includes a cockpit located control member 30 for pilot actuation with a combination retainer and frictional drag member at 31. A first control rod 32 is pivotally coupled at its ends to said control member and canard cage 20 with clockwise movement of the control member advancing and eventually, as it approaches its forward extreme of travel, inclining the cage and canard to the FIG. 2 position. A second control rod 33 couples flap control member 30 to wing flaps 3 in a manner to effect flap deployment coincident with cage advancement and conversely flap retraction occurs with rearward cage and canard positioning.

While the foregoing system is shown and described in a manner suitable for use in light aircraft, it is to be understood that the system could be readily modified for use in larger aircraft such as by the use of servomotors for trim positioning of the canard within its cage as well as positioning of the cage and wing flaps. Such modification of the subject system would readily suggest itself to those skilled in the present field without departing from the scope of the present invention as defined in the appended claims.

In use, loading of the aircraft is accomplished in the usual manner with attention to maintaining the C.G., within fore and aft limits. The aircraft take-off roll may be reduced by partial flap deployment resulting in automatic advancement of the canard to an intermediate position between its extremes of travel. Normal or flight attitude entails full flap retraction with automatic repositioning of the canard rearwardly with lift forces from airfoils and moment arms in equilibrium. Trimming of the aircraft for level flight is achieved by incremental movement of the canard by canard trim means 11 which permits the canard elevators (not shown) to remain streamlined for minimum drag. For the sake of illustration of the present invention, the canard elevators and means for controlling same are not shown. Preparation for landing of the aircraft utilizing flaps 3 entails positioning of the flap control 30 clockwise so as to fully and rapidly advance cage 20 to forwardly locate and incline canard 6 to increase both the canard angle of attack and the canard moment arm to neutralize the tendency of the aircraft to pitch nose down as would otherwise occur by reason of the increased main wing lift and moment arm created by flap deployment.

While I have shown and described but a few embodiments of the invention, it will be apparent to those skilled in the art that the invention may be embodied still otherwise without departing from the spirit and scope of the invention.

Having thus described the invention, what is desired to be secured in a Letters Patent is:

I claim:

1. A flight control system for an aircraft having a canard and a main wing with wing flaps, said system comprising,
    a canard positionable toward and away from the aircraft center of gravity,
    canard carrier means within the forward portion of the fuselage and adapted for generally fore and aft movement with at least a portion of said movement being along a path inclined to the aircraft longitudinal axis for increasing the canard angle of attack,
    flap and canard control means coupled to the main wing flaps and to said canard carrier whereby said carrier and the canard carried thereby are advanced away from the aircraft center of gravity when said flaps are deployed to alter the canard moment arm and to thereby maintain canard and main wing lift forces substantially in equilibrium relative the aircraft center of gravity, and
    canard trim means coupled to said canard for varying canard lift independently and without movement of said canard carrier means.

2. The flight control system claimed in claim 1 wherein said canard carrier means includes a cage, said canard entrained for fore and aft movement within said cage.

3. The flight control system claimed in claim 2 wherein said canard carrier means includes a rail assembly, said cage carried by said rail assembly.

4. The flight control system claimed in claim 3 wherein said rail assembly includes an upwardly inclined forward segment for inclining said cage and the canard carried thereby to increase the canard angle of attack.

5. The flight control system claimed in claim 4 wherein said cage and canard are inclined to increase the canard angle of attack simultaneously with and directly proportional to flap deployment to maintain the aircraft lift forces in substantial equilibrium.

6. The flight control system claimed in claim 2 wherein said cage defines an open area, said canard having a central portion slidably entrained within said open area of the cage and permitting canard movement relative said cage for aircraft trimming purposes.

7. A flight control system for an aircraft having a main wing and wing flaps, said system comprising,
 a canard,
 canard carrier means mounted in the aircraft fuselage, said carrier means including a cage within which said canard is movably mounted and rail means transversed by said cage, said rail means having an inclined segment and a substantially horizontal segment whereby said canard may be located respectively to the aircraft longitudinal axis to vary canard angle of attack and along said axis to vary the canard moment arm,
 flap and canard control means coupled to said flaps and said cage for positioning same along said rails, and
 trim means coupled to said canard to position same within said cage.

8. In combination,
 a canard disposed transversely of the forward portion of an aircraft fuselage and having a central portion within said fuselage,
 a cage also disposed within the forward portion of the aircraft fuselage and positionable fore and aft, said cage defining an open area to receive said central portion of the canard, means movably mounting said canard in said cage for fore and aft travel of the canard, canard control means coupled to said cage to position the cage fore and aft, and
 canard trim means including a control in the aircraft cockpit and coupled to said central portion of the canard to position same toward and away from the aircraft center of gravity for trimming of the aircraft.

9. The combination claimed in claim 8 additionally including rail means within the forward portion of the aircraft fuselage and on which said cage is movably mounted.

10. The combination claimed in claim 9 wherein said rail mesans includes both horizontal and inclined segments whereby the canard may be positioned relative the aircraft center of gravity and additionally relative the aircraft longitudinal axis with the latter positioning causing alteration of the canard angle of attack.

11. The combination claimed in claim 8 wherein said canard trim means includes a splined shaft.

* * * * *